United States Patent Office 3,341,456
Patented Sept. 12, 1967

3,341,456
WATER-BASED HYDRAULIC FLUID
Arthur W. Sawyer, Hamden, Conn., assignor to Olin Mathieson Chemical Corporation, a corporation of Virginia
No Drawing. Filed June 11, 1964, Ser. No. 374,239
11 Claims. (Cl. 252—75)

This invention relates to water-based hydraulic fluid compositions which are comprised chiefly of water and a polyoxyalkylene polyol. More specifically, this invention relates to fire-resistant fluid compositions of: (A) water, (B) random addition products of ethylene oxide and propylene oxide and a polyfunctional initiator, and (C) inhibitor compositions. The fluids of this invention have a homogeneous liquidity range embracing and exceeding 0° to 150° F. and the non-aqueous portion of the novel fluids have flash points in excess of 500° F.

This invention achieves the necessary fluidity and uniformity over a temperature range from below 0° F. to 150° F. without the incorporation of low molecular weight glycols as is commonly employed in prior art. The water-based hydraulic fluids of the prior art, which are uniform liquids over the temperature range of from below 0° F. to above 150° F. are essentially mixtures of ethylene glycol and water in which the ethylene glycol is 9 to 70 percent by weight and most commonly 40 to 60 percent. These fluids of the prior art are thickened to desired viscosity with various amounts of high molecular polymers, esters or salts.

The compositions shown by Zisman et al. in U.S. Patent No. 2,602,780 are illustrative of prior art. Zisman et al. show typical glycol-water mixtures thickened with polymers. The fluids of prior art require at least a three-component mixture to ensure adequate viscosity and fluidity. These components are water, a thickener and a coupler. The coupler is commonly a low molecular weight glycol or glycol-ether, which functions as an anti-freeze agent and, frequently, also as a mutual solvent at elevated temperatures. The presence of this low molecular weight anti-freeze agent imparts a low flash point of less than 300° F. to the non-aqueous portion of fluid. A flash point of this magnitude, i.e., less than 300° F., is considered an unsafe level in event the fluid strikes a hot surface such as molten metal. When the water from such a fluid is evaporated, the residue will ignite.

The instant invention obviates the use of the glycol coupler and the residue of fluids of this invention exhibit a flash point in excess of 500° F. and a fire point above 550° F. The components of the fluids of the instant invention are mutually miscible throughout the temperature range of −15° F. to +165° F.

Commercial fire-resistant hydraulic fluids have viscosities at 100° F. in the range of 25 to 120 centistokes, and most preferably in the range 30 to 85 centistokes. The fluids which comprise this invention also have viscosities in this preferred range.

Hydraulic fluid compositions of this invention comprise from about 50 to about 79 percent by weight of a random addition product of ethylene oxide and propylene oxide with a polyfunctional initiator from about 0.15 to about 5.0 percent of an inhibitor composition and the balance being water.

The random addition products of ethylene oxide and propylene oxide with a polyfunctional initiator (i.e., polyols or amines) employed in the novel fluids of this invention must have a molecular weight greater than 600 and must exhibit a viscosity at 100° F. of at least 90 centistokes. These polyols can be conveniently prepared by reacting a mixture of ethylene oxide and propylene oxide in which the weight ratio of ethylene oxide to propylene oxide varies from about 0.60:1 to about 1.75:1, with an initiator, such as tripentaerythritol, in the presence of an alkaline catalyst and a solvent such as dimethyl sulfoxide. Useful initiators include, for example, ethylene glycol, propylene glycol, diethylene glycol, triethylene glycol, the butanediols, the pentane-diols, glycerine, pentaerythritol, dipentaerythritol, tripentaerythritol, phenyl diethanolamine, diethanolamine, triethanolamine, propanolamine, tributanolamine, ethylene diamine, trimethylol-propane, sorbitol, and methyl glucoside.

The inhibitor composition of the novel fluid composition of this invention can consist solely of an antioxidant. The amount of antioxidant employed is such that in the final fluid composition it is present in an amount of from about 0.15 to about 1.5 percent by weight. Useful antioxidants include, for example, phenothiazine, sodium mercaptobenzothiazole, p-hydroxy diphenylamine, polymerized trimethyl hydroquinoline, hydroquinone, and mixtures thereof. The inhibitor composition can also contain corrosion inhibitors, as exemplified by borax-glycol condensates, salicylal monoethanolamine, alkali metal borates, alkali metal soaps of fatty acids and mixtures thereof which, when employed, will be present in the final fluid composition in an amount of from about 0.25 to about 2.45 percent by weight; and vapor phase corrosion inhibitors such as morpholine, N-ethyl morpholine, diisopropylamine nitrite, dicyclohexyl ammonium nitrite, amino methyl propanol and mixtures thereof which, when employed, will be present in the final fluid composition in an amount of from about 0.1 to about 1.0 percent by weight.

The resultant fluid compositions are useful in systems which transmit mechanical energy by fluid pressure such as hydraulic brakes, jacks, servo mechanisms, presses, control devices and the like.

The fluid compositions of this invention are typified in the following examples, which are illustrative but not limitative.

EXAMPLE I 94 g. of tripentaerythritol, 90 g. of dimethyl sulfoxide and 0.38 g. of potassium hydroxide were charged into a 5 liter, round-bottomed flask. The flask was fitted with a stirrer, a refrigerated addition funnel, a thermometer, a nitrogen inlet and a refrigerated reflux condenser. A nitrogen atmosphere was maintained throughout the reaction; the reactor and the reactants were protected from moisture. The slurry was heated to 160–170° C. and a 60:40 mixture (by weight) of ethylene oxide and propylene oxide was added at such a rate that no large percentage of un-reacted oxides was present at any time. The reaction was continued until 2500 g. of mixed oxide had been added.

The intermediate product of the foregoing reaction was isolated by stripping in the presence of five percent (based on the weight of the product) of attapulgite clay at 160° C. following which the attapulgite clay was removed by filtration.

This product, which had a viscosity of 182 centistokes at 210° F. and 1160 centistokes at 100° F., exhibited a pour point below 30° F. While exposure to air was minimized, 0.38 g. of phenothiazine antioxidant and 98 g. of distilled water were added to 94 g. of the foregoing product. The thus-prepared hydraulic fluid at 0° F. was a hazy liquid exhibiting a viscosity of 2500 cs. while at 165° the fluid exhibited a homogeneous appearance. The viscosity at 100° F. was 72.7 cs. and the pour point was below −15° F. The flash point of the non-aqueous portion was approximately 600° F. while the fire point of the non-aqueous portion was approximately 615° F.

EXAMPLE II

The procedure of Example I was followed to obtain a hydraulic fluid of the following composition:

| Component: | Weight percent |
|---|---|
| Tripentaerythritol adduct prepared by reacting 1.34 moles of tripentaerythritol with 39.2 moles of a mixture of ethylene oxide and propylene oxide (1:1 weight of ratio of oxides). The approximate molecular weight was 1860 | 76.7 |
| Morpholine | 0.1 |
| Potassium oleate | 1.0 |
| Phenothiazine | 0.2 |
| Borax-ethylene glycol condensate [1] | 2.0 |
| Water, distilled | 20.0 |
| | 100.0 |

[1] The borax-ethylene glycol condensate employed had a viscosity at 77° F. of 22,000 cs.; at 100° F. of 6,600 cs. and at 170° F. of 400 cs.; a pour point of 33° F. and a pH (95 percent product and 5 percent water) of 7.68.

EXAMPLE III

The procedure of Example I was followed to obtain a hydraulic fluid of the following composition:

| Component: | Weight percent |
|---|---|
| Tripentaerythritol adduct prepared by reacting 0.16 mole of tripentaerythritol with 66.8 moles of a mixture of ethylene oxide and propylene oxide (1:1 weight ratio of oxides). The approximate molecular weight was 10,000 | 60.0 |
| N-ethyl morpholine | 1.0 |
| Salicylal monoethanolamine | 0.2 |
| Sodium mercaptobenzothiazole | 0.5 |
| Diamyl ammonium laurate | 1.0 |
| Water, distilled | 37.3 |
| | 100.0 |

EXAMPLE IV

The procedure of Example I (except that dimethyl sulfoxide was omitted) was used to add ethylene oxide and propylene oxide in 55:45 weight ratio (random mixture) to triethylene glycol to yield a diol with a molecular weight of approximately 1200 and a viscosity at 100° F. of 104 cs. To 66.0 g. of this material there were added 0.7 g. dioctyl diphenylamine and 33.3 g. water to yield a fluid which was a homogeneous liquid in the temperature range from below −15° F. to above +165° F. and which exhibited a viscosity at 100° F. of 52 cs.

EXAMPLE V

To 70.0 g. of an adduct prepared by reacting glycerine with a mixture of ethylene oxide and propylene oxide (50:50 weight ratio), having a viscosity at 210° F. of 30 cs. and a molecular weight of approximately 2600 there was added 0.4 g. phenothiazine and 29.6 g. water to yield a liquid which was homogeneous over the range of −40° to +170° F. and which had a viscosity at 100° F. of 82 cs.

What is claimed is:

1. A fluid composition comprising from about 50 to about 79 percent by weight of a random addition product of ethylene oxide and propylene oxide with a polyfunctional initiator selected from the group consisting of: (A) a glycol of the formula:

wherein R is alkylene of from 2 to 6 carbon atoms and $n$ is an integer of 1 to 5, (B) an amine of the formula:

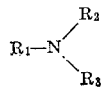

wherein $R_1$ is hydroxyalkyl of from 2 to 8 carbon atoms and $R_2$ and $R_3$ are independently selected from the group consisting of phenyl, hydrogen and hydroxyalkyl having from 2 to 8 carbon atoms, and (C) a material selected from the group consisting of ethylene diamine, glycerine, trimethylol propane, sorbitol, methyl glucoside, pentaerythritol, dipentaerythritol and tripentaerythritol, the said random addition product being prepared by reacting the polyfunctional initiator with a mixture of ethylene oxide and propylene oxide in which the weight ratio of ethylene oxide to propylene oxide is from about 0.60:1 to about 1.75:1, said addition product having a molecular weight of greater than 600 and a viscosity at 100° F. of at least 90 centistokes, about 0.15 to about 5.0 percent of an inhibitor composition selected from the group consisting of phenothiazine, sodium mercaptobenzothiazole, p-hydroxy diphenylamine, dioctyl diphenylamine, polymerized trimethyl hydroquinoline, hydroquinone, borax-glycol condensate, salicylal monoethanolamine, an alkali metal borate, an alkali metal soap of a fatty acid, morpholine, N-ethyl morpholine, diisopropylamine nitrite, dicyclohexyl ammonium nitrite, amino methyl propanol, and mixtures thereof, and the balance being water.

2. The composition of claim 1 wherein the said initiator is tripentaerythritol.

3. The composition of claim 1 wherein the said initiator is triethylene glycol.

4. The composition of claim 1 wherein the said initiator is triethanolamine.

5. The composition of claim 1 wherein the said initiator is glycerine.

6. The fluid composition of claim 1 wherein the inhibitor composition is an antioxidant selected from the group consisting of phenothiazine, sodium mercaptobenzothiazole, p-hydroxy diphenylamine, dioctyl diphenylamine, polymerized trimethyl hydroquinoline, hydroquinone, and mixtures thereof, which in the fluid composition is present in an amount of from about 0.15 to 1.5 percent by weight.

7. The composition of claim 6 wherein the said antioxidant is phenothiazine.

8. The composition of claim 6 wherein the said antioxidant is dioctyl diphenylamine.

9. A fluid composition comprising from about 50 to about 79 percent by weight of a random addition product of ethylene oxide and propylene oxide with a polyfunctional initiator selected from the group consisting of: (A) a glycol of the formula:

wherein R is alkylene of from 2 to 6 carbon atoms and $n$ is an integer of 1 to 5, (B) an amine of the formula:

wherein $R_1$ is hydroxyalkyl of from 2 to 8 carbon atoms and $R_2$ and $R_3$ are independently selected from the group consisting of phenyl, hydrogen and hydroxyalkyl having from 2 to 8 carbon atoms, and (C) a material selected from the group consisting of ethylene diamine, glycerine, trimethylol propane, sorbitol, methyl glucoside, pentaerythritol, dipentaerythritol and tripentaerythritol, the said random addition product being prepared by reacting the polyfunctional initiator with a mixture of ethylene oxide and propylene oxide in which the weight ratio of ethylene oxide to propylene oxide is from about 0.60:1 to about 1.75:1, the said addition product having a molecular weight of greater than 600 and a viscosity at 100° F. of at least 90 centistokes, about 0.15 to 1.5 percent by weight of an antioxidant selected from the group consisting of phenothiazine, sodium mercaptobenzothiazole, p-hydroxy diphenylamine, polymerized trimethyl hydroquinoline, hydroquinone and mixtures thereof, about 0.25 to about 2.45 percent by weight of a corrosion inhibitor selected from the group consisting of a borax-glycol condensate, salicylal, monoethanolamine, an alkali metal borate and an alkali metal soap of a fatty acid and mixtures thereof, from about 0.1 to about 1.0 percent by weight of a vapor phase corrosion inhibitor selected from the group consisting of morpholine, n-ethyl morpholine, diisopropylamine nitrite, dicyclohexyl ammonium nitriate, amino methyl propanol and mixtures thereof, and the balance being water.

10. The fluid composition of claim 9 wherein the said antioxidant is phenothiazine, the said corrosion inhibitor is a mixture of borax-ethylene glycol condensate and potassium oleate, and the said vapor phase corrosion inhibitor is morpholine.

11. The fluid composition of claim 9 wherein the said antioxidant is sodium mercaptobenzothiazole, the said corrosion inhibitor is a mixture of salicylal monoethanolamine and diamyl ammonium laurate, and the said vapor phase corrosion inhibitor is N-ethyl morpholine.

References Cited

UNITED STATES PATENTS

| | | | |
|---|---|---|---|
| 2,060,138 | 11/1936 | Taylor | 252—75 |
| 2,401,743 | 6/1946 | Bowman et al. | 260—615 |
| 2,558,030 | 6/1951 | Zisman et al. | 252—75 |
| 2,602,780 | 7/1952 | Zisman et al. | 252—73 |
| 2,665,312 | 1/1954 | Ohlmann et al. | 260—611.5 |
| 2,674,619 | 4/1954 | Lundsted | 260—485 |
| 2,687,377 | 8/1954 | Stewart et al. | 252—51.5 |
| 2,979,524 | 4/1961 | Wright et al. | 260—462 |

FOREIGN PATENTS 610,505  10/1948  Great Britain.

LEON D. ROSDOL, *Primary Examiner.*

R. D. LOVERING, S. D. SCHWARTZ,
*Assistant Examiners.*